United States Patent
Zampieri et al.

(10) Patent No.: US 10,128,738 B2
(45) Date of Patent: Nov. 13, 2018

(54) DETERMINATION OF ENTERING AND EXITING SAFE MODE

(71) Applicant: Infineon Technologies AG, Neubiberg (DE)

(72) Inventors: Stefano Zampieri, Padua (IT); Fabio Ballarin, Padua (IT)

(73) Assignee: Infineon Technologies AG, Neubiberg (DE)

( * ) Notice: Subject to any disclaimer, the term of this patent is extended or adjusted under 35 U.S.C. 154(b) by 313 days.

(21) Appl. No.: 15/205,566

(22) Filed: Jul. 8, 2016

(65) Prior Publication Data

US 2018/0013340 A1    Jan. 11, 2018

(51) Int. Cl.
| | | |
|---|---|---|
| *H03L 7/00* | (2006.01) | |
| *H02M 1/088* | (2006.01) | |
| *G06F 1/30* | (2006.01) | |
| *H02M 1/32* | (2007.01) | |
| *H02M 1/00* | (2006.01) | |

(52) U.S. Cl.
CPC ............ *H02M 1/088* (2013.01); *G06F 1/305* (2013.01); *H02M 1/32* (2013.01); *H02M 2001/0003* (2013.01); *H02M 2001/0012* (2013.01)

(58) Field of Classification Search
CPC ... G06F 1/305; G06F 1/30; G06F 1/28; G06F 1/26; G06F 1/24; H03K 3/012; H02M 1/088; H02M 1/32
USPC ............... 327/530, 142, 143, 531, 535, 537, 327/538–543
See application file for complete search history.

(56) References Cited

U.S. PATENT DOCUMENTS

| | | | | |
|---|---|---|---|---|
| 8,575,978 | B2* | 11/2013 | Komatsu ................. | H02H 3/24 327/143 |
| 9,812,941 | B2* | 11/2017 | Sicard ..................... | H02M 1/08 |
| 2003/0112567 | A1* | 6/2003 | Sun ......................... | G06F 1/305 361/90 |
| 2013/0169350 | A1* | 7/2013 | Whatmough .......... | G01R 31/30 327/530 |
| 2013/0321071 | A1* | 12/2013 | Pietri ...................... | H03K 17/22 327/540 |
| 2015/0130519 | A1* | 5/2015 | Amick .................... | H03K 17/22 327/143 |
| 2017/0077805 | A1* | 3/2017 | Sicard .................... | H02M 1/08 |
| 2017/0324324 | A1* | 11/2017 | Ballarin ................. | H02M 1/08 |

OTHER PUBLICATIONS

"TLE4254, High Accuracy Low Dropout Voltage Tracking Regulator", Infineon Technologies AG, Datasheet, Rev. 1.2, Nov. 18, 2009, 21 pp.

* cited by examiner

*Primary Examiner* — Thomas Skibinski
(74) *Attorney, Agent, or Firm* — Shumaker & Sieffert, P.A.

(57) ABSTRACT

The disclosure describes examples of integrate circuit (IC) chips. An IC chip includes a first detector configured to generate information indicative of whether an input supply voltage or power is greater than or equal to a first threshold, a second detector configured to receive a circuit voltage or current level and generate information used to indicate a status of the IC chip based on the received circuit voltage or current level, and a controller configured to cause the IC chip to enter a safe mode in response to both the first detector indicating that the input supply voltage or power is greater than the first threshold and the circuit voltage or current level being greater than a second threshold.

20 Claims, 6 Drawing Sheets

DETERMINATION OF ENTERING AND EXITING SAFE MODE

TECHNICAL FIELD

The disclosure relates to electrical circuits capable of rejecting electrical disturbances, and more particularly, to techniques for controlling electrical circuit output in response to an electrical disturbance.

BACKGROUND

The supply voltage (e.g., from battery or power source) for an integrated circuit (IC) chip can experience fast transient spikes in voltage such as from high peak-to-peak noise. The fast changes in the supply voltage can cause the voltage output of the IC chip to increase to an undesirable level. In addition, the fast changes in the supply voltage can cause the output from status pins to indicate the incorrect status.

SUMMARY

This disclosure describes example techniques for accurate determination of when an integrated circuit (IC) chip should enter and exit safe mode. In safe mode, the output of the IC chip may be turned off. As described in more detail, a controller uses both the output of a detector circuit and a value of an internal variable (e.g., circuit current or voltage level) to determine whether the IC chip should enter safe mode. In examples where the IC chip is operating in safe mode, the controller may use the output of the detector circuit, and may not rely on the value of the internal variable, to determine when to exit safe mode.

In one example, the disclosure describes an integrated circuit (IC) chip comprising a first detector configured to generate information indicative of whether an input supply voltage or power is greater than or equal to a first threshold, a second detector configured to receive a circuit voltage or current level and generate information used to indicate a status of the IC chip based on the received circuit voltage or current level, and a controller configured to cause the IC chip to enter a safe mode in response to both the first detector indicating that the input supply voltage or power is greater than or equal to the first threshold and the circuit voltage or current level being greater than or equal to a second threshold.

In one example, the disclosure describes a method of operation of an integrated circuit (IC) chip, the method comprising generating information indicative of whether an input supply voltage or power is greater than or equal to a first threshold, generating information used to indicate a status of the IC chip based on receiving a circuit voltage or current level, and causing the IC chip to enter a safe mode in response to both the input supply voltage or power being greater than or equal to the first threshold and the circuit voltage or current level being greater than or equal to a second threshold.

In one example, the disclosure describes an integrated circuit (IC) chip comprising means for generating information indicative of whether an input supply voltage or power is greater than or equal to a first threshold, means for generating information used to indicate a status of the IC chip based on receiving a circuit voltage or current level, and means for causing the IC chip to enter a safe mode in response to both the input supply voltage or power being greater than or equal to the first threshold and the circuit voltage or current level being greater than or equal to a second threshold.

The details of one or more aspects of the disclosure are set forth in the accompanying drawings and the description below. Other features, objects, and advantages of the disclosure will be apparent from the description and drawings, and from the claims.

DETAILED DESCRIPTION

Integrated circuit (IC) chips such as voltage regulators, including linear regulators such as low-dropout regulators (LDOs), include circuitry to detect if there are spikes or other changes in the input voltage or power (e.g., source voltage or power) that could potentially damage components within the IC chips or devices connected to the IC chips. For example, for dynamic behavior of input voltage (battery/supply voltage), there is a potential risk/harm that can be caused by fast input transient, "cold cranks," high peak-to-peak noise on the input voltage and so on that increase the input supply voltage to be greater than a threshold voltage. These power disturbances may be a form of high frequency AC voltage or current superimposed on the constant DC battery/supply voltage or current.

These types of power disturbances can drive the output of the IC chip, embedded into the system, up to a level that can damage IC chip components. In some cases, the fast input transient or power disturbance may not damage the IC chip itself, but may damage components connected to the IC chip because of the increase of the voltage at the output of the IC chip caused by the fast input transient or power disturbance. Because the power disturbances may increase the output of the IC chip to an undesirable level that may damage the IC itself or components connected to the IC, the IC may be configured to enter a safe mode in response to the disturbance. In the safe mode, the output of the IC may be shutoff or squelched (which are examples of turning off the output) to avoid the IC from damaging other devices.

Additionally, the power disturbances and fast input transient voltages may cause status information of the IC chip to be incorrect. For example, the IC chip may include one or more output pins that provide status information such as whether the power is at the right level (power good (PG) pin), whether the voltage is too high or too low (under voltage/over voltage pin), a status condition pin (ST pin) and the like. The power disturbances can cause the output of these pins to provide incorrect information (e.g., indicate that the power is right, when the power is not right), especially if the features are sensitive to disturbances of the input supply voltage. In some cases, the output of theses status pins may oscillate (toggle), and therefore the microcontroller that receives the output of these status pins is not receiving the correct status information indicating the actual status of the IC chip. Rather, the microcontroller is receiving an oscillating output.

Not all power disturbances can necessarily increase the output voltage of the IC chip to damage the IC chip or devices coupled to the IC chip. The operation state of the IC chip may also control whether a power disturbance has negative consequences. For instance, the power disturbance may cause the input supply voltage or power to reach a threshold voltage or power level. In a first operation state of the IC chip, the input supply voltage or power reaching the threshold voltage level may increase the output of the IC chip to damage the IC chip or a device connected to the IC chip, but in a second operation state of the IC chip, the input supply voltage or power reaching the threshold voltage level may not cause the output of the IC chip to damage the IC chip or a device connected to the IC chip. An output capacitor connected to the IC chip, the load current that the IC chip outputs, and various other such parameters impact operation state of the IC chip, and hence, the consequences of the effects from the power disturbances.

Accordingly, the IC chip should not always enter safe mode in response to a power disturbance. However, in some examples, the IC chip automatically enters safe mode in response to the power disturbance causing the input supply voltage or power reaching the threshold voltage or power level.

This disclosure describes example techniques to selectively cause the IC chip to enter safe mode. For example, in addition to determining whether the input supply voltage or power reached a threshold level (e.g., via a power/peak detector), a controller of the IC chip may also evaluate a circuit current or voltage value, referred to VQ, to determine whether the IC chip should enter safe mode. The VQ may be a level from which the IC chip determines the status information (e.g., the IC chip determines the output of the PG pin, under voltage pin, over voltage pin, ST pin, and the like based on the VQ level). If both the power/peak detector indicates that the voltage is greater than or equal to a threshold voltage or power level and the VQ level is outside a safe range (e.g., indicating that the chip status may be such that there could be potential damage), the controller may turn off the output of the IC chip, and configure the IC chip in safe mode. When the input supply voltage or power stabilizes (e.g., after the end of the power disturbance), as determined from the power/peak detector, the controller may cause the IC chip to exit safe mode.

As described above, in some examples, the power disturbance causes the output of the status pins to oscillate (e.g., toggle between different voltage levels). In some examples, the controller may latch the output of the status pins (e.g., hold the output of the status pins to a fixed voltage that correctly indicates the status) until the input supply voltage or power stabilizes. The controller may then de-latch the output of the status pins after the input voltage is within a safe range. When de-latched, if the VQ level is outside a safe range, the output of the status pin will indicate that the VQ level is outside a safe range. Accordingly, de-latching the status pin does not mean that the status pin will indicate that the VQ level is within a safe range. Rather, de-latching the status pin means that the operation of the status pin is back to default mode where if the VQ level is outside a safe range then the status pin is at one voltage level and if the VQ level is within a safe range then the status pin is at a different voltage level.

Figure 1:
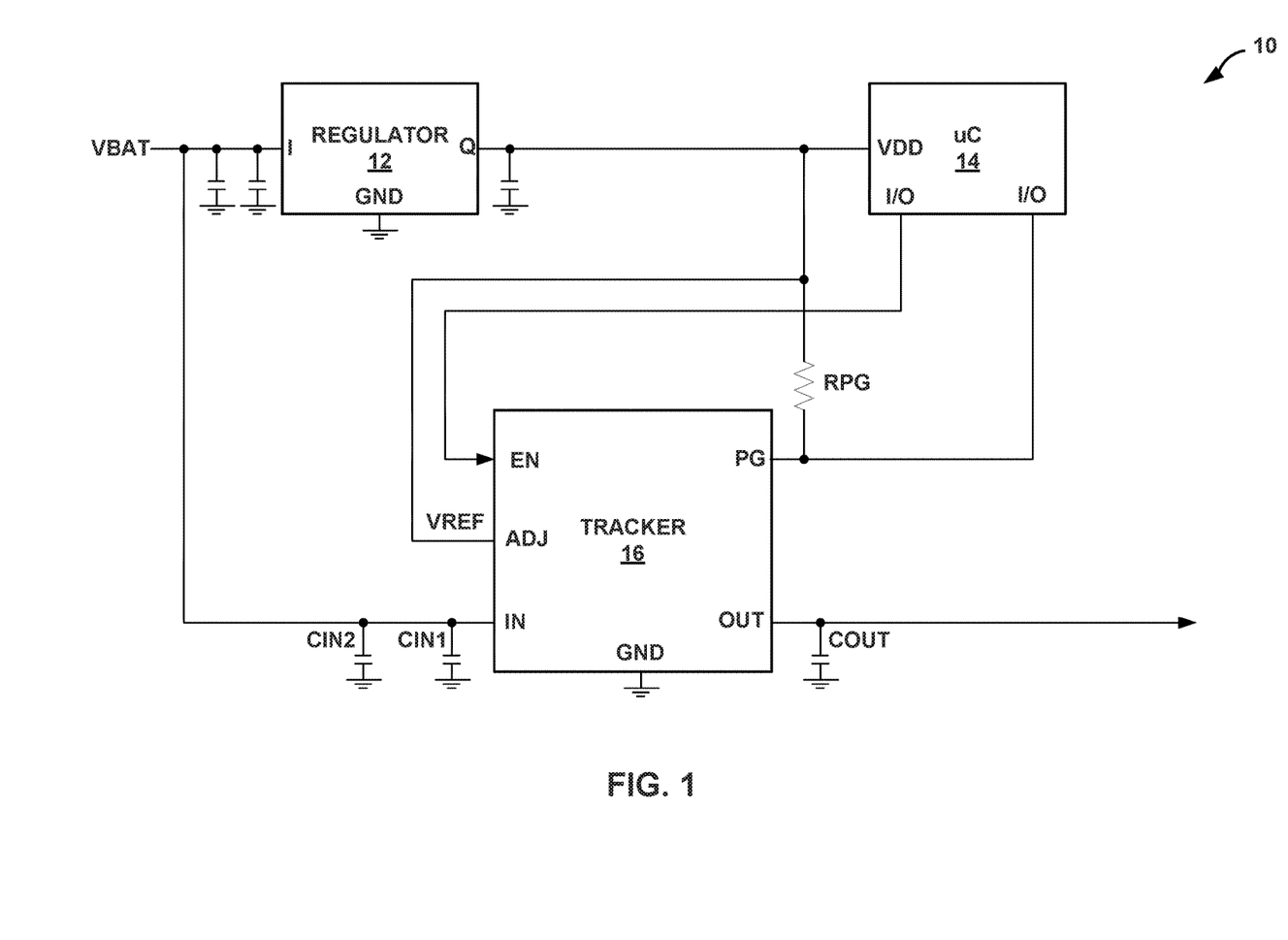
FIG. 1 is a block diagram illustrating an example system in accordance with one or more example techniques described in this disclosure.

FIG. 1 is a block diagram illustrating an example system 10 in accordance with one or more example techniques described in this disclosure. System 10 may be an example of a power delivery system such as for automotive applications. However, the techniques described in this disclosure are not limited to example illustrated in FIG. 1, and may be applicable to variety of systems including those where an integrated circuit (IC) chip is to enter and exit a safe mode of operation.

System 10 includes regulator 12, microcontroller 14, and tracker 16. Although regulator 12, microcontroller 14, and tracker 16 are illustrated as separate components, in some examples, one or more of regulator 12, microcontroller 14, and tracker 16 may be combined into a common IC chip. For ease of description, the examples are described with regulator 12, microcontroller 14, and tracker 16 being separate. Also, system 10 illustrates one example configuration of regulator 12, microcontroller 14, and tracker 16. There may be other configurations, and the example techniques should not be considered limited to the example illustrated in FIG. 1.

Examples of regulator 12 include regulators sold under product numbers TLE4271-2, TLE4471, and TLE6368 by Infineon Technologies Corporation, although other examples of regulator 12 are possible. Examples of microcontroller 14 include C167, XC16X family of microcontrollers, and TC17xx family of microcontrollers by Infineon Technologies Corporation, although other examples of microcontroller 14 are possible. These examples of regulator 12 and microcontroller 14 are provided merely to assist with understanding and should not be considered limiting.

In some examples, regulator 12 and/or microcontroller 14 may be configured to include circuitry to perform the example techniques described in this disclosure. In such examples, regulator 12 and/or microcontroller 14 may be different than the examples provided above, but may have similar operational parameters. However, regulator 12 and/or microcontroller 14 may not have similar operational parameters to those of the examples provided above in all cases.

As described in more detail, tracker 16 may be configured to perform the example techniques described in this disclosure to selective enter and exit a safe mode based on both an input power supply voltage or power and a circuit voltage or current level (e.g., a voltage at a circuit node of tracker 16 or a current through a circuit node of tracker 16). In some examples, the operational parameters for tracker 16 may be similar to the TLE4254 family of voltage trackers by Infineon Technologies Corporation. However, tracker 16 need not operate like TLE4254 voltage tracker in all examples. Reference to the TLE4254 family of voltage trackers is provided merely as an example and should not be considered limiting.

Both regulator 12 and tracker 16 receive power from a battery or some other power source (e.g., VBAT in FIG. 1). Regulator 12 may receive the input supply voltage and power from the power source and output a fixed voltage level. Tracker 16 may also receive the input supply voltage and power from the power source and output a selectable voltage level.

For instance, tracker 16 may be a monolithic integrated low-dropout regulator (LDO) with voltage tracking. Tracker 16 may be an IC in its own IC chip or as part of a larger IC chip. Tracker 16 may supply power to off-board systems (e.g., sensors in powertrain management systems under the severe conditions of automotive applications). With supply voltages up to 40V, the output voltage from tracker 16 follows a reference voltage applied to the adjust input (ADJ) with relatively high accuracy. For instance, the ADJ pin of tracker 16 receives the output of regulator 12 as reference voltage (VREF).

In some examples, the voltage at the ADJ pin of tracker 16 may be as low as 2.0V. Tracker 16 may be able to drive loads up to 70 mA while tracker 16 follows with high accuracy the output of a main voltage regulator 12 acting as reference (e.g., 5V output of regulator 12 being VREF on the ADJ pin), as illustrated in FIG. 1.

Tracker 16 includes a power good (PG) pin that outputs to an input/output (I/O) pin of microcontroller 14. The PG pin is illustrated as one example, and not all examples of tracker 16 require such a PG pin. The resistor RPG is a pull-up resistor for examples where the PG pin is an open collector or open source output. The PG pin of tracker 16 is a status pin. For instance, the voltage at the PG pin indicates whether the output power of tracker 16 is within an acceptable range (e.g., not too low and not too high). In some examples, tracker 16 includes circuit blocks that receive the output of tracker 16 as a feedback input signal. This feedback input signal is one example of a circuit voltage or current level, referred to as VQ, that the example techniques described in this disclosure may utilize to determine whether to enter a safe mode, but need not necessarily rely upon to determine whether to exit safe mode. A status detector circuit block receives the VQ value and outputs a voltage or current that controls the output of the PG pin. If the status detector circuit block determines that VQ is too low or too high, then the status detector circuit block outputs a voltage or current that causes the PG pin to output a logic low indicating that the power is too low or too high (e.g., the power is not good).

The PG pin is provided as one example of a pin used to indicate the status of tracker 16. There may be other examples such as under or over voltage pin, a status condition pin, and other such examples. For ease of description, the disclosure is described with respect to the PG pin, but the techniques should not be considered limited to the PG pin.

Microcontroller 14 receives the output of the PG pin, and in some examples, selectively enables or disables tracker 16 via the enable (EN) pin based on the voltage of the PG pin. For example, if microcontroller 14 determines that the output of tracker 16 is outside an acceptable range based on the voltage on the PG pin, then microcontroller 14 may disable tracker 16 and some point later enable tracker 16.

While relying on microcontroller 14 to selectively enable and disable tracker 16 may be sufficient in many instances, there may be cases where microcontroller 14 is inadequate to selectively enable and disable tracker 16. Furthermore, some examples of tracker 16 may not include the EN pin, which means relying on microcontroller 14 to enable or disable tracker 16 may not be feasible.

There may be various reasons why relying on microcontroller 14 can be inadequate for selectively enabling and disabling tracker 16. One cause for the output of tracker 16 to be outside a desired range can be due to disturbance (e.g., noise) on the input supply voltage or power (e.g., VBAT). The disturbance may be from fast input transients, cold cranks, or some other high peak-to-peak noise source. This disturbance may superimpose on the output of tracker 16 causing the output of tracker 16 to be outside a set range.

In addition, this disturbance may cause the voltage at the PG pin to toggle between different voltages (oscillate between a logic high and a logic low). Because the voltage at the PG pin is toggling high and low, rather than staying fixed at a logic low, microcontroller 14 may not be able to determine whether the output of tracker 16 is or is not within the desired range or may incorrectly determine that the output of tracker 16 is within the desired range. Additionally, the VQ voltage level may be drift from the voltage at the ADI pin (e.g., 5V) to higher values (e.g., 12V) due to the disturbance, which may harm tracker 16 or components connected to the output of tracker 16.

To test the behavior of tracker 16 when there is a disturbance on the input supply voltage or power (VBAT), an LV124 E06 test may be implemented. In the LV124 E06 test, a voltage disturbance is purposely added and the voltage at the PG pin is tested to see if the voltage at the PG pin is oscillating.

Not only could the disturbance cause the PG pin to toggle, but the disturbance may cause components within tracker 16 to be damaged or devices that are connected to tracker 16 to be damaged. However, it is not necessary that the same amount of disturbance will cause damage in all cases. The operation state of tracker 16 may affect whether the disturbance will have any negative impact.

For instance, the capacitance of output capacitor (COUT) and the input capacitors (CIN1, CIN2), the load current outputted by tracker 16, and other parameters impact the consequences of the disturbance (e.g., high energy ripple at IN). Depending on these parameters, tracker 16 may be very sensitive to the disturbance or can reject the disturbances well enough to cause no fail/harmful behavior. In other words, the same disturbance may cause tracker 16 to fail with potential harm or can simply be rejected letting tracker 16 work within its specified operation parameters.

This disclosure describes example techniques for selectively entering tracker 16, and more generally various types of LDOs, trackers, or other types of integrated circuits, in a safe mode in response to a disturbance and fixing the output of a status pin in response to the disturbance. For instance, the safe mode circuit described in this disclosure utilizes both information of whether the input supply voltage or power is greater than or equal to a first threshold and whether a circuit current or voltage level (e.g., VQ level), used to generate information used to indicate a status of tracker 16 (e.g., used to generate the voltage at the PG pin), is greater than a second threshold. One example of the circuit current or voltage level is the actual output voltage of tracker 16. Another example of the circuit current or voltage level is current flowing through an inductance on a DC/DC converter. In general, a voltage at a node or current through a node within tracker 16 are examples of the circuit current or voltage. The circuit for safe mode may latch the output information indicative of the status of tracker 16 to a fixed value that indicates the actual status of tracker 16 until the input supply voltage or power is less than the first threshold.

In the example techniques described in this disclosure, tracker 16 may be considered as an IC chip. As described in more detail below, the IC chip that is tracker 16 includes a first detector configured to generate information indicative of whether an input supply voltage or power is greater than or equal to a first threshold. For example, the first detector generates information indicating whether the voltage (e.g., root-mean-square (RMS) of the AC part of the power) or power at the IN pin of tracker 16 is greater than or equal to a first threshold. In this disclosure, when the voltage at level of the input supply voltage is described, this disclosure is referring to the RMS level of the AC part of the power, a peak-to-peak level of the AC part of the power, or a DC level if the disturbance is more than a transient. The RMS level of the AC part of the power is provided as one example.

The IC chip that is tracker 16 includes a second detector configured to receive the VQ level (e.g., a circuit current or voltage) and generate information used to indicate a status of the IC chip based on the received VQ level. For example, the second detector receives the VQ level and outputs a voltage (e.g., an analog status indicator) that is used to indicate a status of the IC chip. The analog status indicator may be converted to a digital value and processed by a controller that outputs an internal digital status indicator. The internal digital status indicator is used to set the voltage the PG pin. In this way, the voltage at the PG pin is based on the VQ level. For example, if the VQ level is based on the actual voltage output of tracker 16 (e.g. the circuit voltage or current is the output voltage of tracker 16), then a high on the PG pin indicates power is good or a low on the PG pin to indicates power is not good. The PG pin is a status pin, where the VQ level (e.g., a circuit current or voltage) can indicate of whether tracker 16 is functioning properly, and PG pin outputs the information indicative of whether tracker 16 is functioning properly (e.g., whether the output voltage is within a desired range).

The IC chip that is tracker 16 also includes a controller (which may be different than microcontroller 14) that causes the IC chip to enter a safe mode in response to both the first detector indicating that the input supply voltage or power is greater than or equal to the first threshold and the VQ level being greater than or equal to a second threshold. In the safe mode, the controller may cause the output of tracker 16 to be turned off. The controller may cause the IC chip to exit the safe mode in response to the input supply voltage or power being less than the first threshold.

During the safe mode, the controller latches the output of the PG pin to a low indicating that tracker 16 is not functioning properly. After the controller causes the IC chip to exit the safe mode, the controller de-latches the output of the PG pin. De-latching the output of the PG pin does not mean that the PG pin will indicate that tracker 16 is functioning properly. Rather, de-latching the output of the PG means that the output of the PG pin is not forced to remain low. To exit safe mode, the input supply voltage or power becomes less than the first threshold. However, the VQ level may still be greater than or equal to the second threshold. In this case, the controller may cause the IC chip to exit safe mode, but because the VQ level is greater than or equal to the second threshold, the PG pin may still be low. When the VQ level becomes less than the second threshold, the PG pin may be high.

Considered another way, assume that both the input voltage level or power is greater than or equal to the first threshold and the VQ level is greater than or equal to a second threshold. In this case, the controller causes the IC chip to enter safe mode and latches the output of the PG pin. Assume that the input voltage level or power is still greater than or equal to the first threshold, but the VQ level is less than the second threshold. In this case, the output of the PG pin may still be latched to indicate that the power is not good. When the input voltage or power becomes less than the first threshold, then the output of the PG pin may indicate that the power is good, assuming that the VQ level is still less than the second threshold.

Accordingly, in some examples, to enter safe mode, the safe mode circuit that includes the first detector, second detector, and controller checks both the input supply voltage (VIN) and the circuit current or voltage level (VQ). However, to exit the safe mode, the safe mode circuit may check the input supply voltage, and may not check the VQ level. This is because, as described above, the VQ sense implementation may be susceptible to the disturbances, the PG pin value may toggle, and if the VQ level is based on the output voltage, the output voltage will be forced low from the safe mode and therefore not provide any additional information about the status. By relying on input supply voltage to return back to normal (e.g., after the disturbance dissipates) to de-latch the output of the PG pin, the toggling may be masked by the safe mode and PG pin voltage is held once safe mode is triggered.

The VQ level may indicate whether tracker 16 is not functioning properly (e.g., if greater than or equal to a threshold). In some examples, even if the disturbance causes the input supply voltage to become greater than the threshold (e.g., the first detector indicates that the input supply voltage is too high), tracker 16 may still be functioning properly (e.g., VQ is within a desired range). For such cases, switching to safe mode may be unnecessary because there are no negative consequences from the disturbance. By relying on both VIN and VQ being outside an operational range, the circuit for safe mode may cause tracker 16 to enter safe mode when there are possible negative consequences from the disturbance and avoid tracker 16 from entering safe mode when there are not possible negative consequences from the disturbance.

Some other techniques, unlike those consistent the techniques described in this disclosure, may rely on independent operation of the example first and second detectors to determine when to enter and exit safe mode and when to assert the voltage at the PG pin (or other pin types such as status pin (ST), over or under voltage, and the like), rather than entering safe mode based on the combination of VIN and VQ, as described in this disclosure. Techniques where both VIN and VQ are not relied upon together, such as in the these other techniques, for entering and exiting safe mode and for determining when to assert the voltage at the PG pin are described in more detail with respect to FIGS. 2A and 2B.

Figures 2A, 2B:
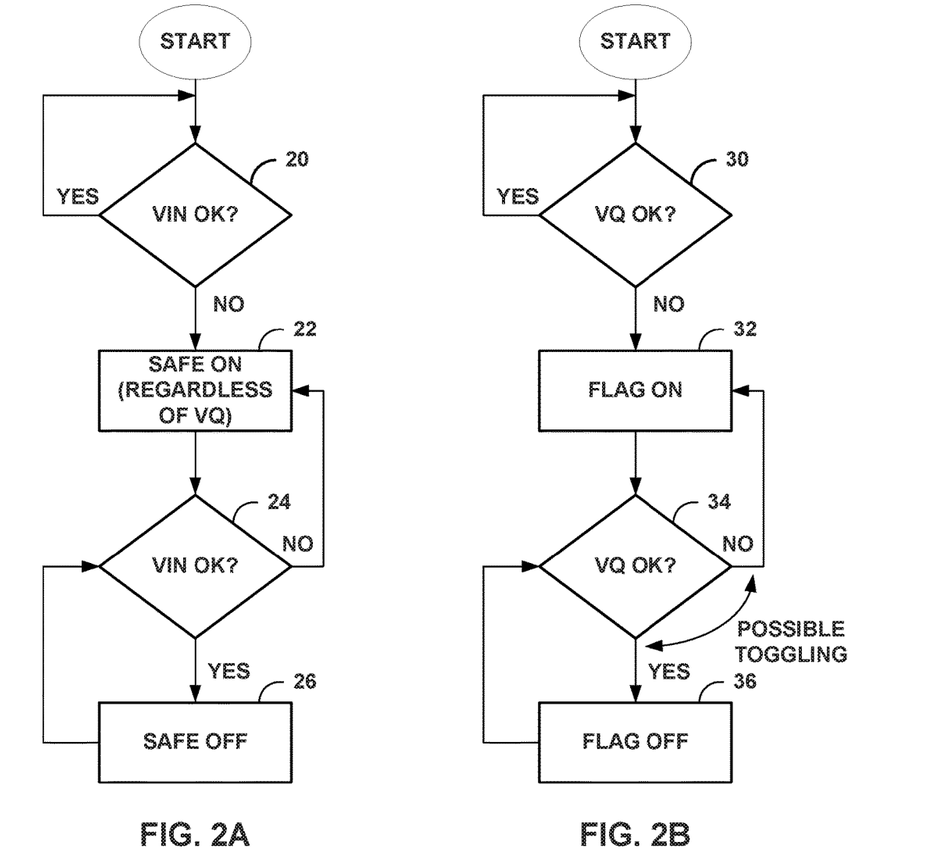
FIG. 2A is a flowchart illustrating an example for entering and exiting a safe mode.
FIG. 2B is a flowchart illustrating an example for asserting and de-asserting a status output signal.

FIG. 2A is a flowchart illustrating an example for entering and exiting a safe mode. As illustrated in FIG. 2A, a first detector determines whether the input supply voltage or power is less than a first threshold (20). As long as the input supply voltage or power is less than the first threshold (YES of 20), the first detector keeps determining whether the input supply voltage or power is less than the first threshold. If, however, the input supply voltage or power is greater than or equal to the first threshold (e.g., due to a disturbance on VBAT) (NO of 20), the IC chip enters safe mode regardless of whether the VQ level is indicative of an error in the operation of the IC chip (e.g., regardless of whether the VQ level is greater than or equal to a threshold) (22). In this case, in these other techniques, the IC chip enters safe mode even though there may not be any negative consequences from the disturbance. However, in accordance with the techniques described in this disclosure, by considering the input voltage and the VQ level together, the IC chip may enter safe mode when there may be negative consequences from the disturbance.

In these other techniques, the first detector determines whether the input supply voltage or power returned to be less than the first threshold (24). If the input supply voltage or power has not returned to be less than the first threshold (NO of 24), the IC chip remains in the safe mode (22). If the input supply voltage or power returns to be less than the first threshold (YES of 24), the IC chip exits the safe mode (26), and remains in normal mode as long as the input supply voltage or power is less than the first threshold.

FIG. 2B is a flowchart illustrating an example for asserting and de-asserting a status output signal. As illustrated in FIG. 2B, a detector determines whether the VQ level is less than a second threshold (30). As long as the VQ level is less than the second threshold (YES of 30), the detector keeps determining whether the VQ level less than the second threshold. If, however, the VQ level is greater than or equal to the second threshold (e.g., due to the IC chip not functioning properly) (NO of 30), the IC chip outputs a voltage on the PG pin (or other example status pins) to indicate that the IC chip is not functioning properly (e.g., turns the flag represented by the voltage at the PG pin on) (32).

The detector determines whether the VQ level returned to be less than the second threshold (34). If the VQ level has not returned to be less than the second threshold (NO of 34), the IC chip keeps indicating that the IC chip is not functioning properly (32). If the VQ level returns to be less than the second threshold (YES of 34), the IC chip outputs a voltage on the PG pin to indicate that the IC chip is functioning properly (e.g., turns the flag represented by the voltage at the PG pin off) (36), and should keep indicating that the IC chip is functioning properly as long as the VQ level is less than the second threshold.

However, although the voltage on the PG pin should indicate whether the IC chip is functioning properly or not functioning properly, as described above, the disturbance on the input supply voltage causes the voltage on the PG pin to toggle. Therefore, microcontroller 14 may not be able to properly determine whether the IC chip is functioning properly or not functioning properly because the output to the microcontroller 14 is not correct.

Figure 3:
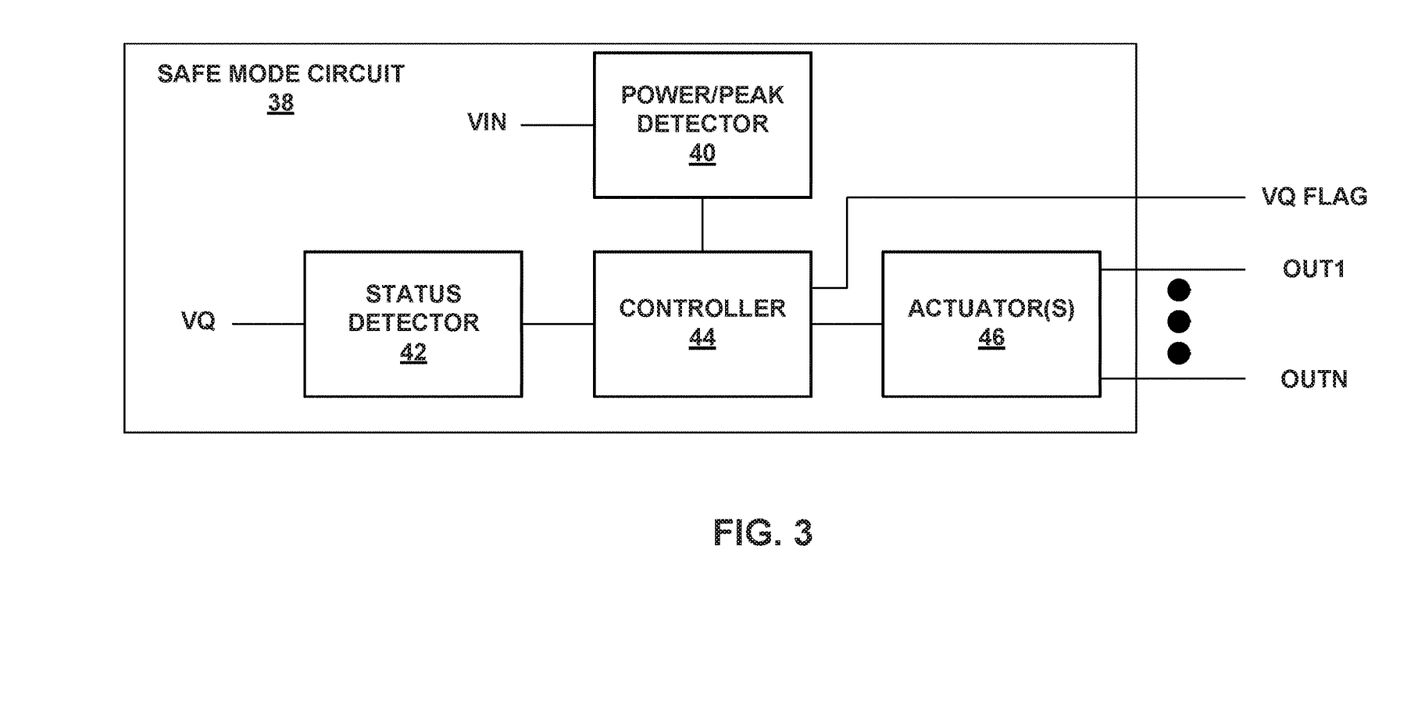
FIG. 3 is a block diagram illustrating an example of a safe mode circuit in accordance with one or more techniques described in this disclosure.

FIG. 3 is a block diagram illustrating an example of a safe mode circuit 38 in accordance with one or more techniques described in this disclosure. Safe mode circuit 38 is an example safe mode circuit of tracker 16. As illustrated in FIG. 3, safe mode circuit 38 includes power/peak detector 40, status detector 42, controller 44, and one or more actuators 46. Controller 44 may be designed with high power supply rejection ratio (PSRR) so that any disturbance on the input supply voltage does not affect controller 44.

Figure 4:
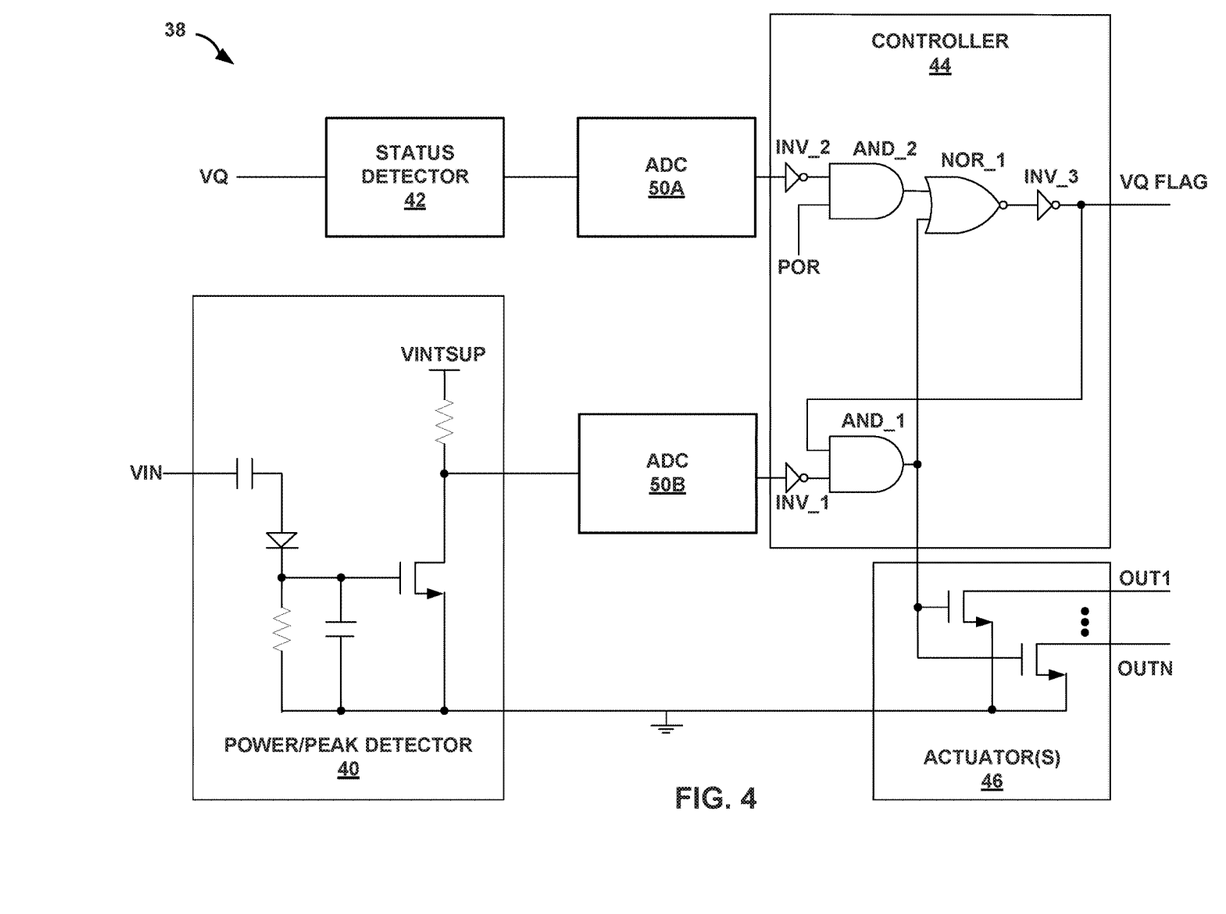
FIG. 4 is a block diagram illustrating the example safe mode circuit of FIG. 3 in greater detail.

Power/peak detector 40 receives the input supply voltage (VIN) as input and determines whether the input supply voltage or power is greater than or equal to a first threshold. There may be various example ways in which to construct power/peak detector 40, and one example construction is illustrated in FIG. 4. Power/peak detector 40 is configured to generate information indicative of whether the input supply voltage or power is greater than or equal to the first threshold. Power/peak detector 40 outputs the information indicative of whether the input supply voltage or power is greater than or equal to the first threshold to controller 44.

Figure 5:
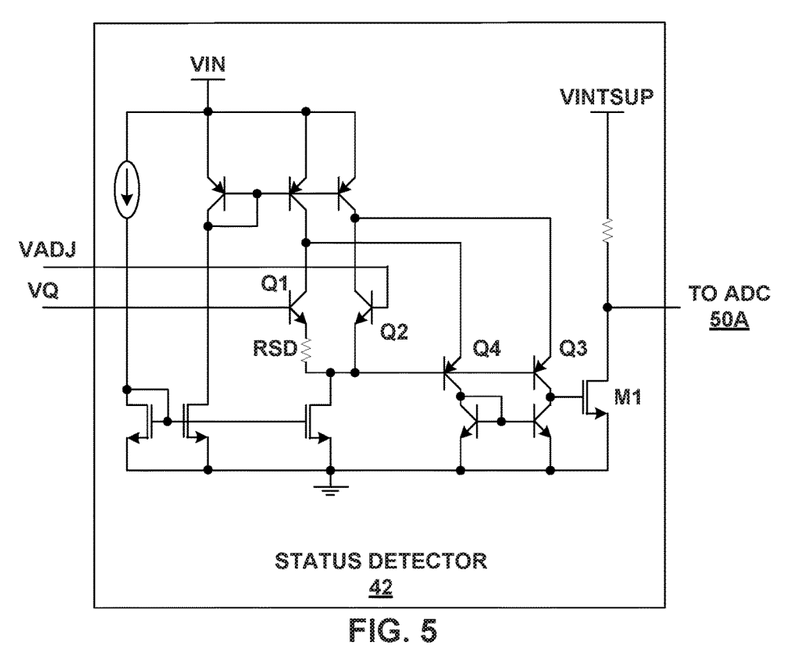
FIG. 5 is a circuit diagram illustrating an example of a status detector in accordance with one or more techniques described in this disclosure.

Status detector 42 receives the circuit voltage or current level (e.g., VQ level), where the circuit voltage or current level is a voltage at or current through various nodes within tracker 16, as input and determines whether the VQ level is greater than or equal to a second threshold. The VQ level may be based on one or more outputs of tracker 16, and is representative of the voltage level of one or more outputs of tracker 16. However, the VQ level may be based on other circuit voltage level than the output of tracker 16 and/or based on current level of currents in tracker 16. There may be various example ways in which to construct status detector 42, and one example construction is illustrated in FIG. 5. Status detector 42 generates information indicative of the status of tracker 16 based on the received VQ level.

Status detector 42 outputs information indicative of the status of tracker 16 to controller 44. In some examples, the output of status detector 42 is an analog status indicator indicating whether the VQ level is greater than or less than a threshold. Controller 44 may receive this analog status indicator, but in some examples, an analog-to-digital converter (ADC) may first convert the analog status indicator into a digital value that controller 44 receives.

Controller 44 may be hardwired analog and/or digital circuitry or may be a programmable hardware of tracker 16. In examples where controller 44 is a programmable hardware, the object code that controller 44 executes (e.g., as firmware or software) may be stored in memory. For ease of description, controller 44 is described as being a hardwired, fixed-function circuit block, but may be a programmable circuit block in other examples.

Controller 44 may be configured to cause tracker 16 to enter a safe mode in response to both power/peak detector 40 indicating that the input supply voltage or power is greater than or equal to the first threshold and the VQ level being greater than or equal to a second threshold (e.g., if VQ is greater than 10% of the nominal value of VQ). In normal mode, transistors in actuators 46 are turned off (e.g., not conducting current). In safe mode, controller 44 activates transistors in actuators 46 that turn off the output of tracker 16 (e.g., when actuators 46 are on, current is not delivered to the output of tracker 16 or the output of tracker 16 is squelched to ground). Both the input supply voltage and power and the VQ level are greater than respective thresholds before controller 44 causes tracker 16 to enter safe mode. Therefore, if the VQ level indicates that tracker 16 is functioning properly, controller 44 may not cause tracker 16 to enter safe mode even if the input supply voltage or power becomes higher than the threshold. If, however, the VQ level becomes too high and the input supply voltage or power becomes too high, then controller 44 may activate respective one or more actuators 46 to turn off the output of tracker 16 as part of entering safe mode.

As illustrated in FIG. 3, controller 44 also outputs the VQ flag, also referred to as an internal digital status indicator. The VQ flag is a voltage that may be used to set the voltage level of a status pin (e.g., the PG pin) or may be actual voltage level of the status pin. In this example, controller 44 includes circuitry that causes the voltage level of VQ flag to become latched (e.g., locking or forcing it to stay in that new state) when tracker 16 enters safe mode. Because the voltage level of the VQ flag becomes latched, the voltage level of the status pin becomes latched. The voltage level of the status pin is referred to as the external digital status indicator.

Accordingly, controller 44 may cause the voltage level of the status pin to an output level even if the VQ level or the generated information indicative of the status of the IC should cause the voltage level at the status pin to change. For example, the disturbance may cause the VQ flag to change or cause the analog output of status detector 42 to oscillate. This change in the VQ flag or toggling in the output of status detector 42 should cause the voltage level of the status pin to toggle (e.g., cause the external digital status indicator to toggle). However, by latching the voltage level of the VQ flag (e.g., the internal digital status indicator), when tracker 16 enters safe mode, controller 44 does not let the voltage level of the status pin change.

When power/peak detector 40 indicates that the input supply voltage or power is less than the first threshold, controller 44 causes tracker 16 to exit the safe mode (e.g., turns off actuators 46) in response to the input supply voltage or power being less than the first threshold. In addition, after tracker 16 exits the safe mode, controller 44 may de-latch the voltage level of the status pin. For instance, the voltage level of the status pin can now change, including change to indicate that the circuit voltage or current level is less than the second threshold. However, the voltage level of the status pin does not have to change, such as if the VQ level is still greater than a threshold. When the VQ level becomes less than the second threshold, controller 44 may output the VQ flag voltage (e.g., internal digital status indicator) which causes the voltage at the status pin (e.g., external digital status indicator) to indicate that tracker 16 is functioning properly.

FIG. 4 is a block diagram illustrating the example safe mode circuit 38 of FIG. 3 in greater detail. FIG. 4 illustrates analog-to-digital converter (ADC) 50A and 50B. ADC 50A may be part of status detector 42 and ADC 50B may be part of power/peak detector 40, but are illustrated as external to status detector 42 and power/peak detector 40 for ease of illustration.

Power/peak detector 40 includes an interconnection of capacitors, resistors, and a transistor. In this example, voltage at the source of the transistor of power/peak detector 40 is proportional to the input supply voltage. ADC 50B converts the analog output from power/peak detector 40 into a digital value (e.g., a first value if input voltage or power greater than or equal to threshold and a second value if input voltage or power less than threshold). FIG. 4 illustrates one example of power/peak detector 40, and other example circuitry for power/peak detector 40 may be possible.

Status detector 42 outputs information indicating the level of VQ. ADC 50A convers the analog status indicator that status detector 42 outputs into a digital value (e.g., a first value if VQ level greater than or equal to threshold and a second value if VQ level less than threshold). An example of status detector 42 is illustrated in more detail in FIG. 5.

Controller 44 includes an inverter INV_2 to invert the output of ADC 50A and an inverter INV_1 to invert the output of ADC 50B. These inverters are optional and based on the design of ADC 50A and 50B. The inverter INV_2 connected to ADC 50A is coupled to an AND gate AND_2 of controller 44, and the AND gate receives a power on reset (POR) input. This gate AND_2 may similarly be optional. For example, power on reset may not be present or may not be implemented in a way where it functions as an input to an AND gate.

Controller 44 is illustrated as including a NOR gate NOR_1 connected to an inverter INV_3, and the output of INV_3 is the VQ flag (e.g., internal digital status indicator), which is used to generate the voltage level for the status pin. A NOR gate connected to an inverter is equivalent to an OR gate. Therefore, the gate NOR_1 connected to inverter INV_3 may be replaced with an OR gate.

The following describes the algorithm of the operation of controller 44 based on the illustrated example in FIG. 4. It should be understood that there are various ways of implementing digital and analog circuitry to perform a particular function. Therefore, the example illustrated in FIG. 4 should not be considered limiting as other ways to construct controller 44 are possible.

When the AND_1 gate is high, the one or more transistors in one or more actuators 46 are activated because AND_1 is coupled to the gates of the transistors of actuators 46. The AND_1 gate is high when the AND_2 gate is high or the AND_1 gate is high and the output of INV_1 is high. Accordingly, one or more actuators 46 are activated when:

AND_1_high=(AND_2_high or AND_1_high) & (INV_1_high).

When actuators 46 are activated, they turn off a transistor that controls the delivery of voltage or current at the output of tracker 16 (e.g., when actuators 46 are activated, the output of tracker 16 is off). As another example, when actuators 46 are activated, they may sink all of the current that tracker 16 is outputting and cause the output of tracker 16 to drop to approximately zero volts to turn off the output of tracker 16.

In some examples, when actuators 46 are activated, they may turn off a transistor that controls the delivery of voltage or current at the output of tracker 16 and, when actuators 46 are activated, they may sink all of the current that tracker 16 is outputting to cause the output of tracker 16 to be approximately zero volts. By both turning off the transistor and sinking the current, the output of tracker 16 may remain low even if there is some coupling from the power source (e.g., VBAT)

As described above, VQ or status detector 42 is sensitive to disturbances in the input supply voltage (VBAT or VIN) and will cause the VQ flag to toggle, which causes the voltage at the status pin (e.g., PG pin) to toggle. To avoid such toggling, in the circuit illustrated in FIG. 4, when the AND_2 gate is high for the first time, the AND_1 gate is turned high. When the AND_1 gate is turned high and INV_1 is high, it does not matter what the output from AND_2 is (e.g., even if toggling) because AND_1 gate out being high will force the output of INV_3 to be high, and the VQ flag will be latched to stay ON. For instance, the output of an OR gate (e.g., the combination of NOR_1 and INV_3) will always be a logic high if one of the inputs is a logic high regardless of what the other input to the OR gate is. Algorithmically, the way in which the VQ flag is latched may be represented as:

(INV_1_high) & (AND_2_high for the first time)
→AND_1_high→VQ flag is latched to stay ON This latching strongly reduces the sensitivity of VQ and the status detector 42 to the disturbance. For example, the AND_1 gate goes low (de-latching VQ flag) only when the disturbance is no longer detected by power/peak detector 40. As illustrated, the AND_1 gate drive some n-channel MOSFETs of actuators 46 that will turn off the output of tracker 16 and place tracker 16 in safe mode. For example, in normal mode, actuators 46 are deactivated (e.g., their gate voltage is not high) and when deactivated, actuators 46 allow current to be outputted by tracker 16 or do not sink the output of tracker 16. In safe mode, actuators 46 are activated (e.g., their gate voltage is high) and when activated, actuators 46 turn off tracker 16 from outputting current or sink any current that tracker 16 does output, as well as pull-down the output of tracker 16 to approximately zero volts.

In this way, this disclosure describes power/peak detector 40 configured to generate information indicative of whether an input supply voltage or power is greater than or equal to a first threshold. Status detector 42 is configured to receive a circuit voltage or current level (VQ level) and generate information (e.g., the analog status indicator) used to indicate a status of tracker 16 based on the received VQ level.

Controller 44 is configured to cause tracker 16 to enter a safe mode in response to both power/peak detector 40 indicating that the input supply voltage or power is greater than or equal to the first threshold and the VQ level being greater than or equal to a second threshold. When tracker 16 is in safe mode, controller 44 is configured to cause tracker 16 to exit the safe mode in response to the input supply voltage or power being less than the first threshold.

Tracker 16 includes a status pin (e.g., PG pin). The information indicative of the status of tracker 16 is information indicative of whether tracker 16 is functioning properly. The status pin outputs the information indicative of whether tracker 16 is functioning properly.

The information indicative of the status of tracker 16 (e.g., the VQ flag also referred to as internal digital status indicator) in part sets a voltage level of the status pin that indicates a status of tracker 16. For example, the output of status detector 42 is one of the inputs of the OR gate formed by NOR_1 and INV_3, and the output of INV_3 is the VQ flag, and the VQ flag sets the voltage level of the status pin. Therefore, the output of status detector 42 in part sets the voltage level of the status pin. In this example, controller 44 is configured to output an internal digital status indicator (e.g., VQ flag) as a feedback signal to an AND gate (e.g., AND_1) within controller 44.

When tracker 16 is in safe mode, controller 44 is configured to cause the voltage level of the status pin to be latched at an output level even if VQ level should cause the voltage level at the status pin to change. Again, status detector 42 may be sensitive to disturbances, and possibly cause VQ flag to toggle without the example techniques described in this disclosure. Therefore, controller 44 latches the VQ flag output to a fixed output level so that the voltage level of the status pin is constant when in safe mode.

When tracker 16 is in the safe mode, controller 44 may cause tracker 16 to exit the same mode in response to the input supply voltage or power being less than the first threshold. In such examples, after tracker 16 exits the safe mode, controller 44 de-latch the voltage level of the status pin. Once de-latched, if the VQ level drops below the second threshold, as determined by status detector 42, then the voltage level of the status pin can change.

In the example of FIG. 3, as illustrated in FIG. 4, controller 44 receives a digital value indicating that the input supply voltage is greater than or equal to the first threshold (e.g., the digital output from ADC 50B). In this example, controller 44 may cause the voltage level of the status pin to be latched at the output level based on the digital value (e.g., AND_1 gate keeps VQ flag latched based on the digital value outputted by ADC 50B).

FIG. 5 is a circuit diagram illustrating an example of a status detector 42 in accordance with one or more techniques described in this disclosure. FIG. 5 illustrates one example of status detector 42 and other examples of status detector 42 are possible. As illustrated, the output of status detector 42 is based on whether transistor M1 is on or off (when off, the output is approximately equal to VINTSUP and when on, the output is approximately zero).

Transistor M1 turns on or off based on collector voltage at transistor Q3. However, in some examples, transistor M1 may toggle on and off due to the disturbance, which means that the VQ flag may toggle on and off. Peak/power detector 40 and status detector 42 may be insufficient to ensure that tracker 16 is placed in safe mode in the correct instances and that the voltage at the status pin (e.g., PG pin) does not toggle. In the techniques described in this disclosure, controller 44 may use both the output of peak/power detector 40 and status detector 42 to determine when to enter safe mode and to keep the voltage at the status pin (e.g., PG pin) from toggling.

The voltage at the Q3 transistor is a function of whether the VQ voltage is greater than or less than a threshold. In the example illustrated in FIG. 5, the voltage at the ADJ pin (VADJ) and the VQ voltage level form as inputs into a differential pair of transistors Q1 and Q2. Because resistor RSD is connected to the emitter of transistor Q1, the resistance level of resistor RSD sets the threshold voltage needed to turn on transistor Q1. Whether transistor Q1 is on or off controls whether transistors Q4 or Q3 is on or off, which in turn controls whether transistor M1 is on or off. The output of status detector 42 is a function of whether transistor M1 is on or off. In this way, the output of status detector 42 is based on whether the voltage of the VQ is greater than or equal to or less than the threshold voltage. For instance, status detector 42 may output an analog status indicator that indicates the status of the VQ level (e.g., status of a circuit voltage or current).

Figure 6:
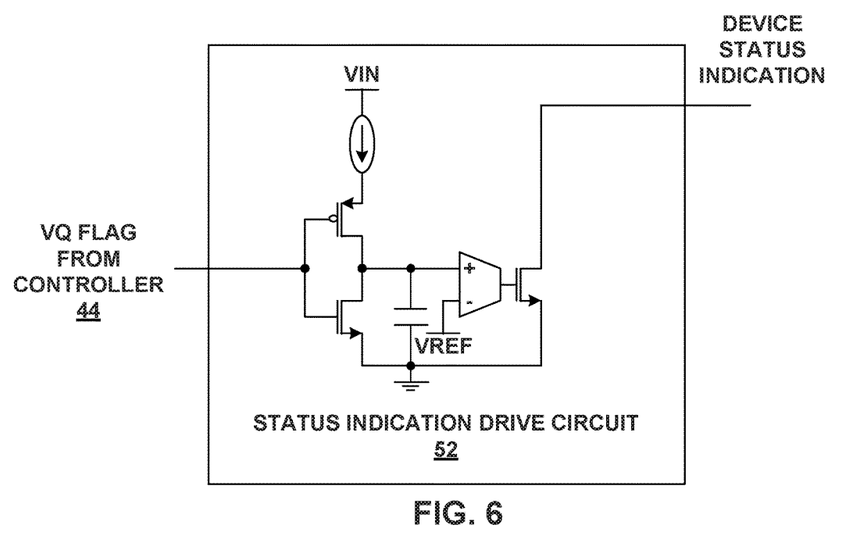
FIG. 6 is a circuit diagram illustrating an example of a status indication drive circuit in accordance with one or more techniques described in this disclosure.

FIG. 6 is a circuit diagram illustrating an example of a status indication drive circuit 52 in accordance with one or more techniques described in this disclosure. Status indication drive circuit 52 is optional and not necessary in every example. In some examples, the VQ flag that controller 44 outputs drives the PG pin of tracker 16 (e.g., the internal digital status indicator is the same as the external digital status indicator that the PG pin outputs). However, in some examples, an intermediate drive circuit, such as status indication drive circuit 52, may be used to drive to the PG pin of tracker 16. The output of the PG pin is the external digital status indicator. The example illustrated in FIG. 6 may also add delay time between events in order to signal the incoming loss of output before tracker 16 is brought into a safe state, interact with the logic of tracker 16 to implement further options, flag this exact situation to microcontroller 14 instead of flagging a general fault event, and/or disable the whole functionality at startup by a POR signal.

Figure 7:
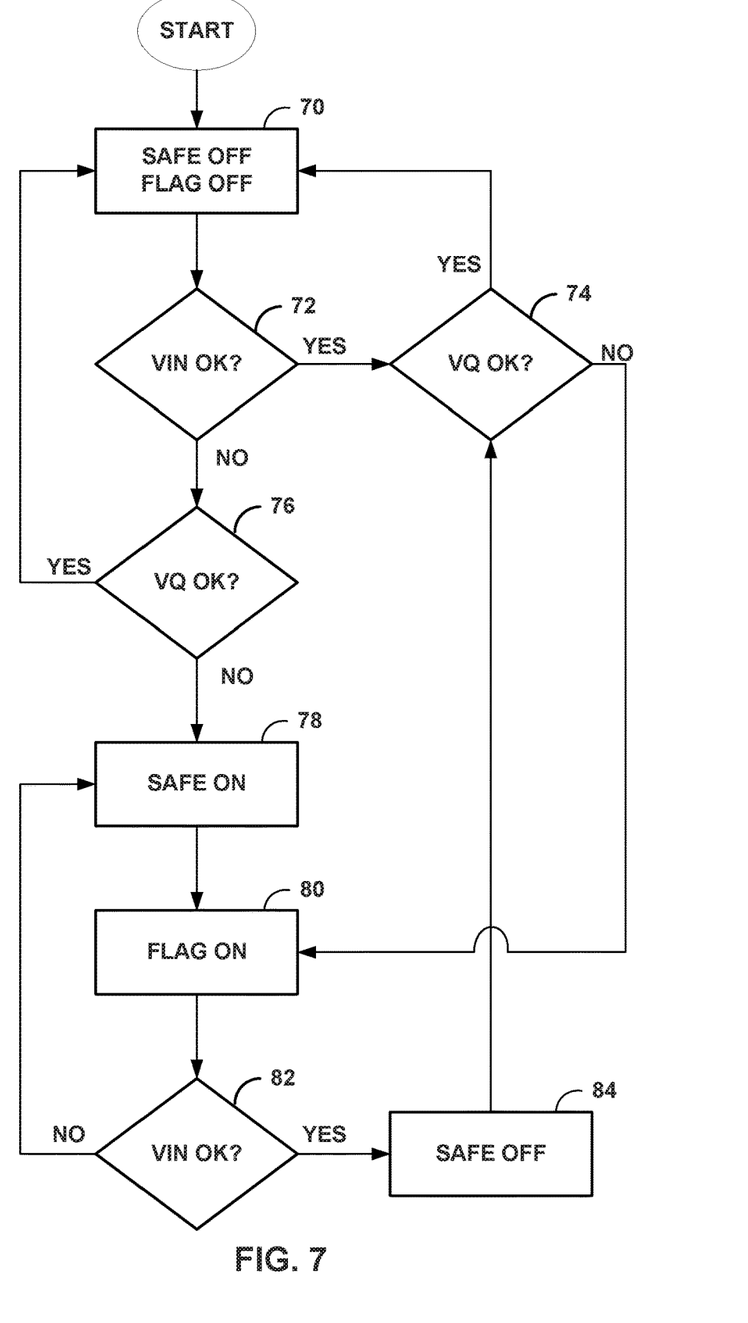
FIG. 7 is a flowchart illustrating an example for entering and exiting safe mode and asserting and de-asserting a status flag in accordance with one or more example techniques described in this disclosure.

FIG. 7 is a flowchart illustrating an example for entering and exiting safe mode and asserting and de-asserting a status flag in accordance with one or more example techniques described in this disclosure. In this example, tracker 16 is in normal mode and the voltage at the status pin indicates that tracker 16 is functioning properly (70). Power/peak detector 40 may determine whether the input supply voltage is less than a first threshold (72). If the input supply voltage is less than the first threshold (YES of 72), then status detector 42 may determine whether the circuit voltage or current level (VQ level) is less than a second threshold (74). If the VQ level is less than the second threshold (YES of 74), tracker 16 remains in normal mode and the voltage at the status pin indicates that tracker 16 is functioning properly (70). If the VQ level is greater than or equal to the second threshold (NO of 74), tracker 16 outputs a voltage at the status pin to indicate that tracker 16 is not functioning properly (80). However, tracker 16 need not necessarily enter safe mode only if determined that tracker 16 is not functioning properly.

If the input supply voltage is greater than or equal to the first threshold (NO of 72), then status detector 42 may determine whether the VQ level is less than a second threshold (76). If VQ level is less than the second threshold (YES of 76), then tracker 16 remains in normal mode and the voltage at the status pin indicates that tracker 16 is functioning properly (70). In this example, although the input supply voltage is greater than or equal to the first threshold, tracker 16 is still not in safe mode because VQ level is less than the second threshold.

If both input supply voltage is greater than or equal to the first threshold and VQ level is greater than or equal to the second threshold (e.g., normal output voltage+10%) (NO of 76), controller 44 may cause tracker 16 to enter safe mode (78) and cause tracker 16 to indicate on the status pin that tracker 16 is not functioning properly (80). Peak/power detector 40 may determine whether the input supply voltage is less than the first threshold (82). If the input supply voltage is greater than or equal to the first threshold (NO of 82), tracker 16 remains in safe mode (78). If the input supply voltage is less than the first threshold (YES of 82), controller 44 causes tracker 16 to exit safe mode (84). Then, if the VQ level is less than the second threshold (YES of 74), the voltage at the status pin indicates that tracker 16 is functioning properly.

In this way, tracker 16 reacts by entering safe mode only if necessary (e.g., when both input supply voltage is greater than or equal to a first threshold and the VQ level is greater than or equal to a second threshold). By entering safe mode only if necessary, the example techniques greatly improve the dynamic response of tracker 16. For instance, noise/disturbance that causes VQ to indicate that tracker 16 is not functioning properly will trigger tracker 16 to enter safe mode (a single load step to the battery may not risk trigger of unwanted entry of safe mode). Also, circuit block sensitive to disturbance on the input supply voltage that cannot be supplied by internal supply but that should work in these faulty condition are made robust by parallelization and integration with digital circuitry.

The techniques described in this disclosure provide for on-chip circuitry to control when to enter and exit safe mode, without over reliance on external components for protection. For example, filtering the high disturbances at system 10 level may mean adding components or may just not be feasible in the input side and not controllable/feasible on the output side (too high capacitance be an issue for stability, reaction time etc). On the other hand, handling this wobble situation (e.g., toggling) on tracker 16 means no hassle for the customer, a safer, pre-determined response of tracker 16 and a better integration with system 10, being able to correctly transmit the fault status to microcontroller 14 and actively protect the loads driven by tracker 16 by keeping the output voltage at a safe level (e.g., 0+10% $VQ_{NOM}$). An on-chip solution is also safer versus other fails like disconnected input capacitors.

EXAMPLE 1

An integrated circuit (IC) chip comprising a first detector configured to generate information indicative of whether an input supply voltage or power is greater than or equal to a first threshold, a second detector configured to receive a circuit voltage or current level and generate information used to indicate a status of the IC chip based on the received circuit voltage or current level, and a controller configured to cause the IC chip to enter a safe mode in response to both the first detector indicating that the input supply voltage or power is greater than or equal to the first threshold and the circuit voltage or current level being greater than or equal to a second threshold.

EXAMPLE 2

The example of example 1, wherein, when the IC chip is in the safe mode, the controller is configured to cause the IC chip to exit the safe mode in response to the input supply voltage or power being less than the first threshold.

EXAMPLE 3

The example of any combination of examples 1 and 2, further comprising a status pin, wherein the information used to indicate the status of the IC chip comprises an analog status indicator that in part sets a voltage level of the status pin that indicates a status of the IC chip, and wherein, when the IC chip is in the safe mode, the controller is configured to cause the voltage level of the status pin to be latched at an output level even if the circuit voltage or current level should cause the voltage level at the status pin to change.

EXAMPLE 4

The example of any combination of examples 1-3, wherein the controller is configured to receive a digital value indicating that the input supply voltage is greater than or equal to the first threshold, and cause the voltage level of the status pin to be latched at the output level based on the digital value.

EXAMPLE 5

The example of any combination of examples 1-4, wherein, to cause the voltage level of the status pin to be latched at the output level, the controller is configured to output an internal digital status indicator as a feedback signal to an AND gate within the controller.

EXAMPLE 6

The example of any combination of examples 1-5, wherein, when the IC chip is in the safe mode, the controller is configured to cause the IC chip to exit the safe mode in response to the input supply voltage or power being less than the first threshold, and wherein, after the IC exits the safe mode, the controller is configured to de-latch the voltage level of the status pin.

EXAMPLE 7

The example of any combination of examples 1-6, wherein the input supply voltage or power is greater than or equal to the first threshold due to a voltage disturbance on power source.

EXAMPLE 8

The example of any combination of examples 1-7, further comprising one or more actuators, wherein, when in the safe mode, the controller activates the one or more actuators that turn off one or more outputs of the IC chip.

EXAMPLE 9

The example of any combination of examples 1-8, further comprising a status pin, wherein the information used to indicate the status of the IC chip is information used to indicate whether the IC chip is functioning properly, and wherein the status pin outputs a digital value indicative of whether the IC chip is functioning properly based on the information used to indicate the status of the IC chip.

EXAMPLE 10

A method of operation of an integrated circuit (IC) chip, the method comprising generating information indicative of whether an input supply voltage or power is greater than or equal to a first threshold, generating information used to indicate a status of the IC chip based on receiving a circuit voltage or current level, and causing the IC chip to enter a safe mode in response to both the input supply voltage or power being greater than or equal to the first threshold and the circuit voltage or current level being greater than or equal to a second threshold.

EXAMPLE 11

The example of example 10, further comprising causing the IC chip to exit the safe mode in response to the input supply voltage or power being less than the first threshold, when the IC chip is in the safe mode.

EXAMPLE 12

The example of any combination of examples 10 and 11, wherein the IC chip comprises a status pin, wherein the information used to indicate the status of the IC chip comprises an analog status indicator that in part sets a voltage level of the status pin that indicates a status of the IC chip, the method further comprising causing the voltage level of the status pin to be latched at an output level even if the circuit voltage or current level should cause the voltage level at the status pin to change, when the IC chip is in the safe mode.

EXAMPLE 13

The example of any combination of examples 10-12, further comprising receiving a digital value indicating that the input supply voltage is greater than or equal to the first threshold, wherein causing the voltage level of the status pin to be latched comprises causing the voltage level of the status pin to be latched at the output level based on the digital value.

EXAMPLE 14

The example of any combination of examples 10-13, wherein causing the voltage level of the status pin to be latched at the output level comprises outputting an internal digital status indicator as a feedback signal to an AND gate, and latching the voltage level of the status pin based on the feedback signal.

EXAMPLE 15

The example of any combination of examples 10-14, further comprising causing the IC chip to exit the safe mode in response to the input supply voltage or power being less than the first threshold, when the IC chip is in the safe mode, and de-latching the voltage level of the status pin.

EXAMPLE 16

The example of any combination of examples 10-15, wherein the input supply voltage or power is greater than or equal to the first threshold due to a voltage disturbance on power source.

EXAMPLE 17

The example of any combination of examples 10-16, further comprising activating one or more actuators to turn off output of the IC chip, when in the safe mode.

EXAMPLE 18

An integrated circuit (IC) chip comprising means for generating information indicative of whether an input supply voltage or power is greater than or equal to a first threshold, means for generating information used to indicate a status of the IC chip based on receiving a circuit voltage or current level, and means for causing the IC chip to enter a safe mode in response to both the input supply voltage or power being greater than or equal to the first threshold and the circuit voltage or current level being greater than or equal to a second threshold.

EXAMPLE 19

The example of example 18, further comprising means for causing the IC chip to exit the safe mode in response to the input supply voltage or power being less than the first threshold, when the IC chip is in the safe mode.

EXAMPLE 20

The example of any combination of examples 18 and 19, further comprising a status pin, wherein the information used to indicate the status of the IC chip comprises an analog status indicator that in part sets a voltage level of the status pin that indicates a status of the IC chip, the IC chip further comprising means for causing the voltage level of the status pin to be latched at an output level even if the circuit voltage or current level should cause the voltage level at the status pin to change, when the IC chip is in the safe mode.

Various examples have been described. These and other examples are within the scope of the following claims.

The invention claimed is:
1. An integrated circuit (IC) chip comprising:
a first detector configured to generate information indicative of whether an input supply voltage or power is greater than or equal to a first threshold;
a second detector configured to receive a circuit voltage or current level and generate information used to indicate a status of the IC chip based on the received circuit voltage or current level; and
a controller configured to cause the IC chip to enter a safe mode in response to both the first detector indicating that the input supply voltage or power is greater than or equal to the first threshold and the circuit voltage or current level being greater than or equal to a second threshold.

2. The IC chip of claim 1, wherein, when the IC chip is in the safe mode, the controller is configured to cause the IC chip to exit the safe mode in response to the input supply voltage or power being less than the first threshold.

3. The IC chip of claim 1, further comprising a status pin, wherein the information used to indicate the status of the IC chip comprises an analog status indicator that in part sets a voltage level of the status pin that indicates a status of the IC chip, and wherein, when the IC chip is in the safe mode, the controller is configured to cause the voltage level of the status pin to be latched at an output level even if the circuit voltage or current level should cause the voltage level at the status pin to change.

4. The IC chip of claim 3, wherein the controller is configured to:
receive a digital value indicating that the input supply voltage is greater than or equal to the first threshold; and cause the voltage level of the status pin to be latched at the output level based on the digital value.

5. The IC chip of claim 3, wherein, to cause the voltage level of the status pin to be latched at the output level, the controller is configured to output an internal digital status indicator as a feedback signal to an AND gate within the controller.

6. The IC chip of claim 3, wherein, when the IC chip is in the safe mode, the controller is configured to cause the IC chip to exit the safe mode in response to the input supply voltage or power being less than the first threshold, and wherein, after the IC exits the safe mode, the controller is configured to de-latch the voltage level of the status pin.

7. The IC chip of claim 1, wherein the input supply voltage or power is greater than or equal to the first threshold due to a voltage disturbance on power source.

8. The IC chip of claim 1, further comprising one or more actuators, wherein, when in the safe mode, the controller activates the one or more actuators that turn off one or more outputs of the IC chip.

9. The IC chip of claim 1, further comprising a status pin, wherein the information used to indicate the status of the IC chip is information used to indicate whether the IC chip is functioning properly, and wherein the status pin outputs a digital value indicative of whether the IC chip is functioning properly based on the information used to indicate the status of the IC chip.

10. A method of operation of an integrated circuit (IC) chip, the method comprising:
generating information indicative of whether an input supply voltage or power is greater than or equal to a first threshold;
generating information used to indicate a status of the IC chip based on receiving a circuit voltage or current level; and
causing the IC chip to enter a safe mode in response to both the input supply voltage or power being greater than or equal to the first threshold and the circuit voltage or current level being greater than or equal to a second threshold.

11. The method of claim 10, further comprising:
causing the IC chip to exit the safe mode in response to the input supply voltage or power being less than the first threshold, when the IC chip is in the safe mode.

12. The method of claim 10, wherein the IC chip comprises a status pin, wherein the information used to indicate the status of the IC chip comprises an analog status indicator that in part sets a voltage level of the status pin that indicates a status of the IC chip, the method further comprising:
causing the voltage level of the status pin to be latched at an output level even if the circuit voltage or current level should cause the voltage level at the status pin to change, when the IC chip is in the safe mode.

13. The method of claim 12, further comprising:
receiving a digital value indicating that the input supply voltage is greater than or equal to the first threshold,
wherein causing the voltage level of the status pin to be latched comprises causing the voltage level of the status pin to be latched at the output level based on the digital value.

14. The IC chip of claim 12, wherein causing the voltage level of the status pin to be latched at the output level comprises:
outputting an internal digital status indicator as a feedback signal to an AND gate; and
latching the voltage level of the status pin based on the feedback signal.

15. The method of claim 12, further comprising:
causing the IC chip to exit the safe mode in response to the input supply voltage or power being less than the first threshold, when the IC chip is in the safe mode; and
de-latching the voltage level of the status pin.

16. The method of claim 10, wherein the input supply voltage or power is greater than or equal to the first threshold due to a voltage disturbance on power source.

17. The method of claim 10, further comprising:
activating one or more actuators to turn off output of the IC chip, when in the safe mode.

18. An integrated circuit (IC) chip comprising:
means for generating information indicative of whether an input supply voltage or power is greater than or equal to a first threshold;
means for generating information used to indicate a status of the IC chip based on receiving a circuit voltage or current level; and
means for causing the IC chip to enter a safe mode in response to both the input supply voltage or power being greater than or equal to the first threshold and the circuit voltage or current level being greater than or equal to a second threshold.

19. The IC chip of claim 18, further comprising:
means for causing the IC chip to exit the safe mode in response to the input supply voltage or power being less than the first threshold, when the IC chip is in the safe mode.

20. The IC chip of claim 18, further comprising a status pin, wherein the information used to indicate the status of the IC chip comprises an analog status indicator that in part sets a voltage level of the status pin that indicates a status of the IC chip, the IC chip further comprising:
means for causing the voltage level of the status pin to be latched at an output level even if the circuit voltage or current level should cause the voltage level at the status pin to change, when the IC chip is in the safe mode.

* * * * *